US011733765B2

United States Patent
Yu (10) Patent No.: US 11,733,765 B2
(45) Date of Patent: Aug. 22, 2023

(54) POWER OVER ETHERNET SYSTEM HAVING MULTIPLE POWER SOURCE DEVICES AND CONTROL DEVICE THEREOF

(71) Applicant: IC Plus Corp., Hsinchu (TW)

(72) Inventor: Chuan Ching Yu, Hsinchu (TW)

(73) Assignee: IC PLUS CORP., Hsinchu (TW)

( * ) Notice: Subject to any disclaimer, the term of this patent is extended or adjusted under 35 U.S.C. 154(b) by 8 days.

(21) Appl. No.: 17/368,874

(22) Filed: Jul. 7, 2021

(65) Prior Publication Data

US 2022/0206560 A1 Jun. 30, 2022

(30) Foreign Application Priority Data

Dec. 24, 2020 (TW) ................................ 109145957

(51) Int. Cl.
| *G06F 1/3287* | (2019.01) |
| *H04L 12/10* | (2006.01) |
| *G06F 13/42* | (2006.01) |
| *G06F 13/40* | (2006.01) |

(52) U.S. Cl.
CPC ........ *G06F 1/3287* (2013.01); *G06F 13/4022* (2013.01); *G06F 13/4282* (2013.01); *H04L 12/10* (2013.01); *G06F 2213/0016* (2013.01)

(58) Field of Classification Search
CPC ............... G06F 1/3287; G06F 13/4022; G06F 13/4282; G06F 2213/0016; H04L 12/10
USPC ......................................................... 713/324
See application file for complete search history.

(56) References Cited

U.S. PATENT DOCUMENTS

| 9,819,501 | B2 * | 11/2017 | Chen ....................... H04L 12/10 |
| 11,012,248 | B1 * | 5/2021 | Chen ................... H04L 12/40045 |
| 11,159,019 | B2 * | 10/2021 | Chong .............. G01R 19/2513 |
| 2005/0272402 | A1 * | 12/2005 | Ferentz ................... H04L 12/10 |
| | | | 713/320 |
| 2020/0076626 | A1 * | 3/2020 | Yam ........................ H04L 12/10 |
| 2022/0209972 | A1 * | 6/2022 | Hsiao ..................... G06F 1/266 |

* cited by examiner

*Primary Examiner* — Brian T Misiura
(74) *Attorney, Agent, or Firm* — Bacon & Thomas, PLLC (57) ABSTRACT

Control device for a power over Ethernet system having multiple power source devices comprises plural control circuits and a signal bus connecting them. Each control device connects plural power source devices and plural port switches, which controls power supply to a port to be connected by a power consuming device. Detection circuit detects at least one power supply state combination. Control signal generator picks up a power control combination signal corresponding to a detected power supply state combination from a power supply to power control look-up-table, upon change in the power supply state and provides the power control signals to corresponding port switches.

15 Claims, 5 Drawing Sheets

| PSS4 | PSS3 | PSS2 | PSS1 | Power Bank# | Power Limit(w) | PSE1 P1_Max | PSE2 P2_Max | PSE3 P3_Max | ... | PSEN PN_Max |
|---|---|---|---|---|---|---|---|---|---|---|
| 0 | 0 | 0 | 0 | 0 | 0 | 0 | 0 | 0 | ... | 0 |
| 0 | 0 | 0 | 1 | 1 | 150 | 80 | 70 | 0 | ... | 0 |
| 0 | 0 | 1 | 0 | 2 | 30 | 30 | 0 | 0 | ... | 0 |
| 0 | 0 | 1 | 1 | 3 | 40 | 40 | 0 | 0 | ... | 0 |
| 0 | 1 | 0 | 0 | 4 | 50 | 50 | 0 | 0 | ... | 0 |
| 0 | 1 | 0 | 1 | 5 | 60 | 60 | 0 | 0 | ... | 0 |
| 0 | 1 | 1 | 0 | 6 | 70 | 70 | 0 | 0 | ... | 0 |
| 0 | 1 | 1 | 1 | 7 | 80 | 80 | 0 | 0 | ... | 0 |
| 1 | 0 | 0 | 0 | 8 | 90 | 80 | 10 | 0 | ... | 0 |
| 1 | 0 | 0 | 1 | 9 | 100 | 80 | 20 | 0 | ... | 0 |
| 1 | 0 | 1 | 0 | 10 | 110 | 80 | 30 | 0 | ... | 0 |
| 1 | 0 | 1 | 1 | 11 | 120 | 80 | 40 | 0 | ... | 0 |
| 1 | 1 | 0 | 0 | 12 | 130 | 80 | 50 | 0 | ... | 0 |
| 1 | 1 | 0 | 1 | 13 | 140 | 80 | 60 | 0 | ... | 0 |
| 1 | 1 | 1 | 0 | 14 | 20 | 20 | 0 | 0 | ... | 0 |
| 1 | 1 | 1 | 1 | 15 | 10 | 10 | 0 | 0 | ... | 0 |

POWER OVER ETHERNET SYSTEM HAVING MULTIPLE POWER SOURCE DEVICES AND CONTROL DEVICE THEREOF

TECHNICAL FIELD OF THE INVENTION

The present invention relates to a power over Ethernet (PoE) system and a control device useful in the system, in particular to a PoE system with a plurality of power source devices, and a control device to be used in such a system.

BACKGROUND OF THE INVENTION

In a wired communication network, supplying electrical power to devices on the network through network cables is already a mature technology. For example, the Power over Ethernet (PoE) power supply system, which is powered by the wiring of the Ethernet, has gradually become popular, due to its advantages in reducing installation costs, as well as centralized power supply and power backup, and safety management. Currently a plurality of PoE systems follow the IEEE 802.3af—2003 standard, which is incorporated herein for reference.

The PoE system provides a scalable function, with which in the initial operation stage, the system can automatically or manually configure its power distribution to the limited number of ports in the system. As time passes, the system can also detect the power supply state automatically, and increase or decrease the number of ports to receive electrical power, based on the detection results in the power supply state. Each power consuming port is connectable by one power consuming device, to receive electrical power from the system.

There are methods to increase power supply in a PoE system. One of the methods is to use multiple power source devices or multiple groups of power supply. The plurality of power source devices is connected to one or more control element in parallel, which control element then supplies or distributes the electrical power of the plural power source devices to individual power consuming devices. Power source devices of non-PoE system can also provide power to the PoE system, to increase its supplied power, as long as the sum of the PoE power supply and the non-PoE power supply can be distributed to one or more loads via Ethernet wire/cables.

In a power supply system wherein a plurality of power source device is used, an important technical problem to be overcome is how to immediately stop supplying power to particular power consuming devices, i.e., to particular ports, when one or more of the plural power source devices shuts down or reduces its output power, in order to avoid the occurrence of overloading on the remaining supplied power. Further, in order to prevent impacts on the remaining power consuming devices due to a shutdown or low-power status, it is also necessary to stop supplying power to the particular power consuming devices immediately or within a very short time, usually within 20 ms, preferably within 2 ms. If the total power consumption of all the connected power consuming devices cannot be reduced within that period, the total system would shut down during the immediate shutdown operation.

The prior art has proposed several solutions to this technical problem, especially means to quickly stop supplying power to sufficient number of power consuming ports, when one or more power source devices fail.

U.S. Pat. No. 7,337,336 discloses a "Method for Rapid Port Power Reduction," useful in a PoE system with multiple power source devices and allowing quickly reducing or stopping power supplied to particular ports, when the power supply status changes. The method comprises the steps of: Coding of possible power supply states. For example, if the system has 4 power source devices, code 1 is assigned to a power source device in normal operation, while code 0 is assigned otherwise. In this way, 16 power supply state codes can be assigned to represent all possible power supply states. For each of the 16 power supply state codes, a power supply index is assigned, which index indicates ports to be supply power (code 1) and ports not to be supply power (code 0). All power supply state code-power consuming index assignments thus form a look-up-table. When the power supply status of any power source device changes, the change is detected, whereby a new power supply status code is generated. Thereupon, a new power consuming index is picked up from the look-up-table and executed. That is, power supplied to ports coded 0 is shut down, while power supplied to ports coded 1 is maintained.

U.S. Pat. No. 7,908,494 discloses a system and method for multiple power over Ethernet (PoE) power supply management. Power supply status signals indicative of an operating condition of a plurality of PoE power supplies are provided to a plurality of power sourcing equipment (PSE) controller chips. Pre-configured combination logic within each of the PSE controller chips converts an indicated operational state of the plurality of PoE power supplies into a powering decision for each of the Ethernet ports served by the PSE controller chip within one microsecond.

Although the immediate power shutting off operation is activated by a change in the power supply state combination, an operation would be activated wherever the power supply state of one power source device changes. It is possible to wire together the power supply state signals with a single state input signal and use the single state input signal to activate the change. This is disclosed in U.S. 2007/0250218, title of the invention: Power management logic that reconfigures a load when a power supply fails.

A method for immediately shutting off power supply to predetermined ports upon change of power supply state is disclosed in TW 2017/29564, "Power source devices and method for power over Ethernet power supply system." The method continuously detects specific communication ports to obtain the power consumption value along the time axis of the power consuming devices connected to the communication ports, and then determines a power consumption trend value. When the trend value shows that the power consumption of a power consuming device exceeds a power supply upper limit for a predetermined time, the power supply to the power consuming device is stopped.

It can be known from the prior art that, although the conventional emergency power-off mechanism can quickly shut off certain ports, it is only suitable for systems with a small number of power consuming devices. When the number of power consuming devices reaches a considerable level, especially when the ratio of the number of power consuming devices to the number of power source devices is high, the length of the assigned code will be too long and the selectivity will be greatly reduced. Shutting off power supply to particular ports will become difficult.

In addition, when the ratio of the number of power consuming devices to the number of power source devices is too high, the selectivity of communication ports for shutting off will be limited; it is not possible to select the target ports dynamically. Therefore, the scalability requirements of the PoE system cannot be met.

OBJECTIVES OF THE INVENTION

One objective of the present invention is to provide a control device for power over Ethernet system having multiple power source devices, which can rapidly reduce or stop the electrical power supplied to specific ports when a power source device fails.

Another objective of the present invention is to provide a control device for power over Ethernet system having multiple power source devices, which can rapidly reduce or stop the electrical power supplied to specific ports when a power source device fails, and is suitable for a system with a greater number of power source devices and power consuming devices.

Another objective of this invention is also to provide a control device for power over Ethernet system having multiple power source devices, which can rapidly reduce or stop the electrical power supplied to specific ports when a power source device fails, and can dynamically select appropriate power consuming device to reduce or stop the power supply in compliance with the reduction or increase in the number of the power consuming devices.

Another objective of the present invention is also to provide a control method useful in the above-mentioned control device for multi-power PoE system.

SUMMARY OF THE INVENTION

According to the first aspect of the present invention, the present invention provides a control device for power over Ethernet system having multiple power source devices. The control device comprises:

a plurality of control circuits, each connected to a plurality of power supply devices and a plurality of port switches, each port switch controlling a power consumption state of at least one port for connection by a power consuming device; wherein each control circuit comprises:

an input terminal for connecting a plurality of power source devices;

a detection circuit connected to the input terminal for receiving a power supply state combination signal representing a combination of power supply state of the plural power source devices;

a first look-up-table memory to store a first power supply to power consumption look-up-table defining a corresponding relation of a plurality of power supply state combination and a plurality of maximum power consumption values; and a control signal generating circuit connected to the detection circuit and the first look-up-table memory and configured to: upon detection of a change in the power supply state combination signal by the detection circuit, generate a power consumption control signal corresponding to the received power supply state combination signal and a corresponding maximum power consumption value in the first power supply to power consumption look-up-table and provide the power consumption control signal to the plurality of port switches;

wherein the detection circuit is configured to: upon detection of a received power supply state combination signal different from a previously received power supply state combination signal, generate a power supply state change signal; and wherein each control circuit is configured to generate, upon receipt of the power consumption control signal, a plurality of power consumption control signals corresponding to the power consumption control signal and to provide the plurality of power consumption control signals to corresponding plurality of port switches for turning ON or OFF the port switches; and a signal bus connecting the plurality of control circuits; wherein, the signal bus is a serial bus. In a preferred embodiment of the present invention, the signal bus uses the IIC communication protocol.

In a preferred embodiment of the present invention, each control circuit determines the port switches that should be ON or OFF in each case of the power supply state combination signals according to a predetermined priority order, and provides the corresponding power consumption control signals to respective port switches.

In a preferred embodiment of the present invention, the first power supply to power consumption look-up-table defines a corresponding relation of a plurality of power supply state combination signals and a plurality of maximum power consumption values, indicating an upper limit of sum of power consumption allowable for all ports in connection with the respective control circuits, under the corresponding power supply state combination. In other embodiments of the present invention, the first power supply to power consumption look-up-table defines a corresponding relation of a plurality of power supply state combination signals and a plurality of maximum power consumption values, indicating an upper limit of sum of power consumption allowable for all ports of the system, i.e., all ports in connection with the plurality of control circuits, under the corresponding power supply state combination.

The control device for power over Ethernet system having multiple power source devices of the present invention may further comprise a master controller. The master controller is equipped with a second look-up-table memory for storing a second power supply to power consumption look-up-table. The second power supply to power consumption look-up-table defines a corresponding relation of a plurality of power supply state combination signals and a plurality of maximum power consumption values, indicating an upper limit of sum of power consumption allowable for all ports in connection with the plurality of control circuit, under the corresponding power supply state combination. The master controller may be configured to: in the initial stage of the system, provide a sub-table of the second power supply to power consumption look-up-table stored in the second look-up-table memory to each corresponding one of the plurality of control circuit. And the plurality of control circuit is further configured to: after receiving the power supply to power consumption look-up-sub-table provided by the master controller, store the power supply to power consumption look-up-sub-table in the first look-up-table memory.

The master controller may also be configured to: in the initial stage of the system, provide the second power supply to power consumption look-up-table stored in the second look-up-table memory to the plurality of control circuit. And the plurality of control circuit is further configured to: after receiving the second power supply to power consumption look-up-table provided by the master controller, store the second power supply to power consumption look-up-table in the first look-up-table memory, as the first power supply to power consumption look-up-table.

In some preferred embodiments, the plurality of control circuit is further configured to: after receiving the second power supply to power consumption look-up-table provided by the master controller, pick up a maximum power consumption value relating to the respective control device from the second power supply to power consumption look-up-table and store the picked up data in the first look-up-table memory, as the first power supply to power consumption look-up-table.

In a preferred embodiment of the present invention, the power supply state combination signal comprises a code with the same number of digit as the number of the plurality of power source devices. In a specific embodiment of the present invention, the power supply state change signal is a conversion of the power supply state signal.

In some preferred embodiments of the present invention, the master controller can be one of the plurality of control circuits, and is configured to: at the initial stage of the system provide the first power supply to power consumption look-up-table or a sub-table thereof prestored in the first look-up-table memory to all other control circuits via the signal bus. In such embodiments, the other control circuits are respectively configured to: after receiving the power supply to power consumption look-up-table provided by the master controller, or a sub-table thereof, store the power supply to power consumption look-up-table in the first look-up-table memory, after necessary processing, According to a second aspect of the present invention, the present invention provides a power over Ethernet system having multiple power source devices. The system comprises:

a plurality of power source devices;

a plurality of communication ports, each communication port to be connected by a power consuming device, to establish a signal and power connection with the power consuming device; each communication port having a port switch to control power supplied to the port; and a control device in connection with the plurality of power source devices and the plurality of communication ports via a network cable, to convert power supplied by the power source devices into electrical power for use by power consuming devices connected to corresponding communication ports, and to generate power consumption control signals for control of power supplied to respective communication ports from the plurality of power source devices;

wherein the control device is one of the control device for power over Ethernet system having multiple power source devices described above.

Other objectives, features, and advantages of the present invention can be appreciated clearly from the detailed description of the preferred embodiments by referring to the drawings. It should be noted that the description of the embodiments of the present invention is only intended to illustrate the main technical content, features, and effects of the present invention, and is not intended to limit the scope of the present invention. It is obvious for the skilled persons n this industry to derive various changes and applications based on the description of the embodiments. As long as they do not depart from the scope of the attached patent claims, they are all within the scope of the present invention.

DETAILED DESCRIPTION OF THE INVENTION

In the following, several embodiments of the invented power over Ethernet system having multiple power sources devices and its control device will be described by reference to the drawings, so to demonstrate the design, features and effects of the present invention.

Figure 1:
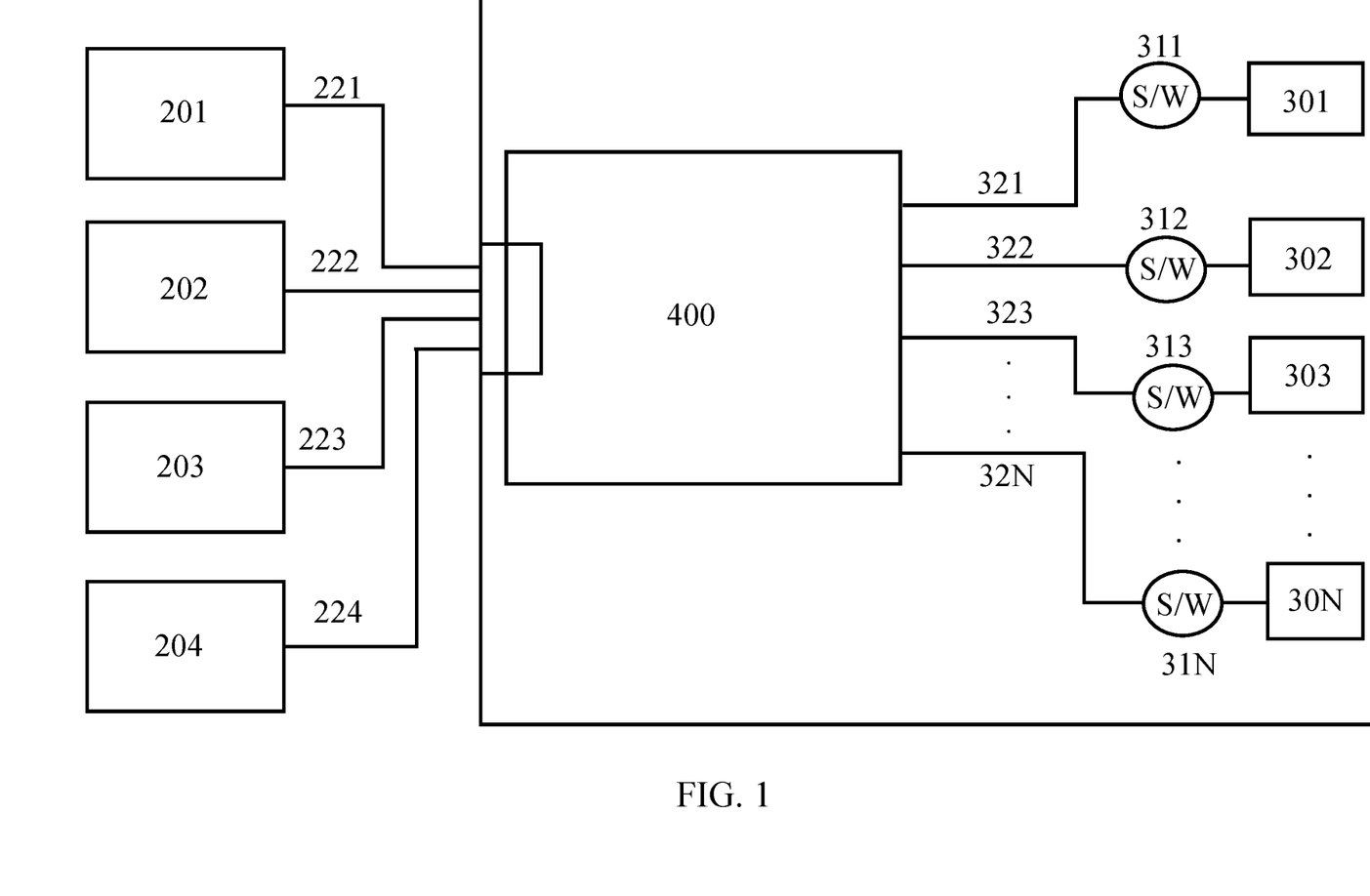
FIG. 1 shows a schematic diagram of a Power over Ethernet system having multiple power source devices.

FIG. 1 shows a schematic diagram of a Power over Ethernet system having multiple power source devices. The PoE system having multiple power source devices in which the invented control device is used, is already a known technology. A PoE system usually comprises:

a plurality of power source devices 201-204, a plurality of communication ports 301, 302, 303, . . . 30N, and a control device 400. As is well known, the plurality of power source devices 201-204 are usually a computer equipment or a network equipment, but may also be simply a power supply or other devices whose main purpose is to supply electrical power. The communication ports 301, 302, 303, . . . 30N can be connected by power consuming devices (not shown), so to establish a signal and power connection with the power consuming devices. Typical power consuming devices are networked computer equipment, network equipment, peripherals such as laser printers, telephones, scanners, cameras, projectors, monitors, microphones, headphones, intelligent household appliances. It may also be just an electrical load, such as LED lights and general household appliances. As shown in FIG. 1, each communication port 301, 302, 303, . . . 30N has a port switch 311, 312, 313, . . . 31N to control power supplied thereto. As will be explained below, each port switch 311, 312, 313, . . . 31N is connected to the control device 400, and is controlled by the control device 400 to switch on or off.

The control device 400 is in connection with the plurality of power source devices 201-204 via network lines 221-224, and with the plurality of communication ports 301, 302, 303, . . . 30N via signal lines 321-32N. The control device 400 converts electrical power supplied by the power source devices 201-204 into electrical power useful by power consuming devices in connection with the communication ports 301, 302, 303, . . . 30N. The power over Ethernet system having multiple power source devices with the above architecture, features and functions is already a mature technology and is widely used all over the world. There are also detailed descriptions in the prior art disclosures mentioned above. Readers can refer to them, if necessary for further research.

The main objective of the present invention is to provide a control device 400 with a novel architecture and a control method applicable in the control device 400, to distribute the electrical power of the plurality of power source devices 201-204 to the plurality of communication ports 301, 302, 303, . . . 30N, especially when one of the plurality of power source devices 201-204 fails, so that the electrical power provided by the remaining power source devices may be properly distributed to the plurality of communication ports 301, 302, 303, . . . 30N.

Figure 2:
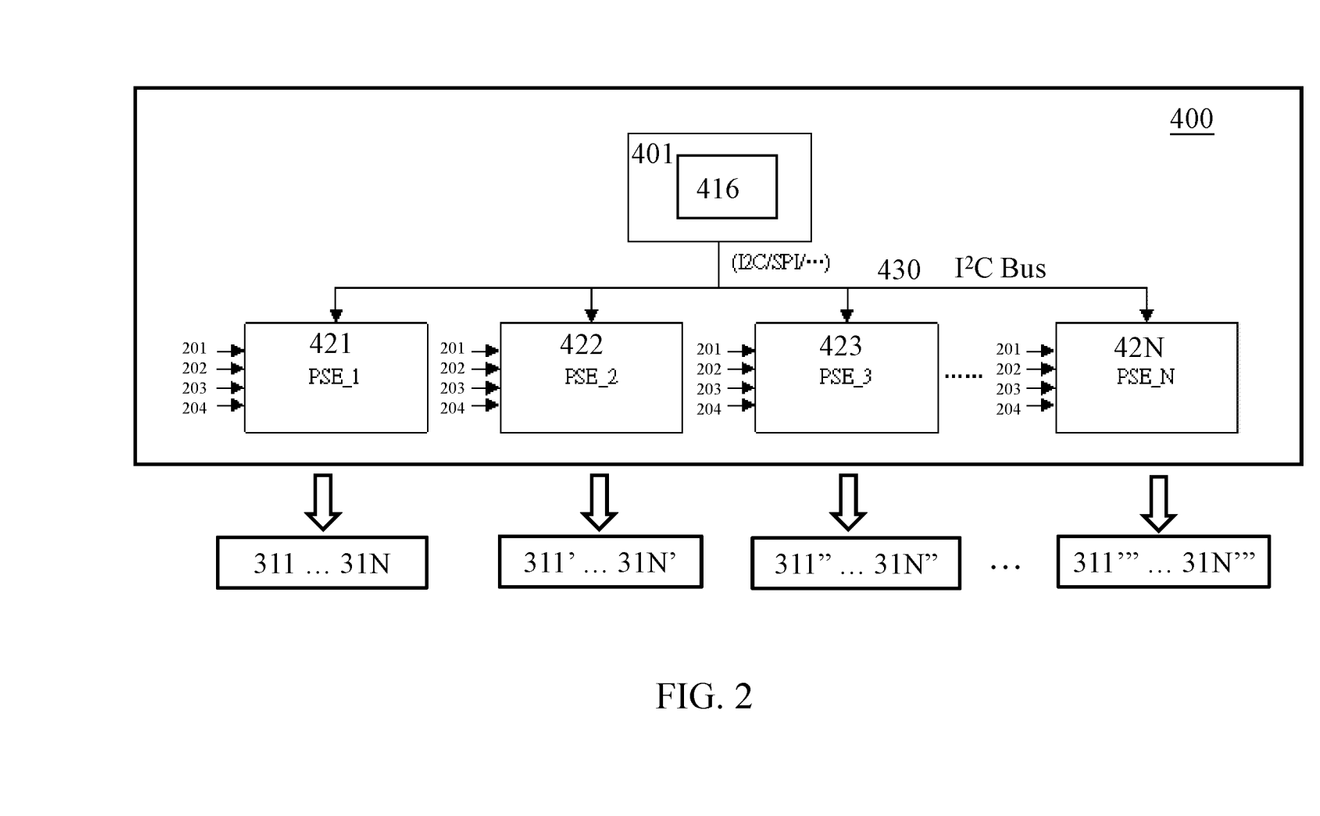
FIG. 2 shows a schematic structural diagram of an embodiment of the invented control device for power over Ethernet system having multiple power source device.

FIG. 2 is schematic structural diagram of one embodiment of the invented control device for PoE system having multiple power source devices. As shown in this figure, the control device 400 includes a master controller 401, a plurality of control circuits 421-42N, and a signal bus 430 connecting the master controller 401 and the plurality of control circuits 421-42N. The output terminals of the control circuits 421-42N are connected to a plurality of port switch 311 to 31N, 311'-31N', 311"-31N", . . . , 311'"-31N'", each port switch 311 to 31N, 311'-31N', 311"-31N", . . . , 311'"-31N'" controls the power consuming state of at least one communication port 301-30N (refer to FIG. 1), and each communication port 301-30N can be connected by a power consuming device (not shown), to provide electrical power and/or digital information to the power consuming devices.

Figure 5:
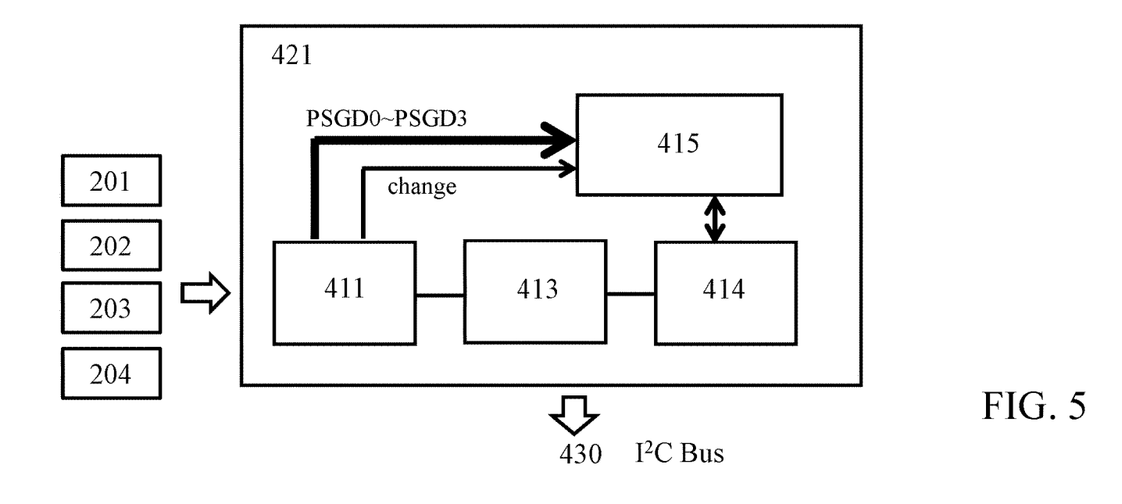
FIG. 5 shows block diagram of one example of the control circuit applicable in the invented control device for power over Ethernet system having multiple power source devices.

FIG. 5 is a block diagram of one example of the control circuit 421-42N applicable in the invented control device for power over Ethernet system having multiple power source devices. As shown in the figure, each of the control circuit 421-42N has an input terminal 411, which includes a plurality of power connector for connecting a plurality of power source devices 201-204, to receive a power supply state combination signal representing a combination of power supply states of the plurality of power source devices. FIG. 5 shows the input terminal 411 is connected to 4 power source devices 201-204. However, the number of power source devices that a PoE system can use is not particularly limited. In addition, although the main purpose of the power connectors is to detect and control, it can also be the transmission channel for the electrical power of the power source devices 201-204, for supplying power to the plurality of communication ports 301, 302, 303, . . . 30N.

The detection circuit 413 is connected to the input terminal 411, for detecting the power supply state of the plurality of power source device 201-204. In a preferred embodiment of the present invention, the power supply state of the plurality of power source devices 201-204 can be directly measured from the power connectors of the input terminal 411. A combination of power supply state of the power source devices 201-204 can be represented by a combination signal, i.e., the combination of signals received by the detecting circuit 413 from the input terminal 411. Other methods for detection and for expressing a combination of the power supply state of a plurality of power source devices can also be applied to the present invention.

In the illustrated example, the power supply state of each power source device 201-204 may be represented by a code digit. For example, code digit 1 represents power good (normal), and code digit 0 represents failure or shutdown. In this way, for 4 power source devices there are totally 16 possible power supply state combinations, representable by 16 codes.

In the known technology, in order to ensure the normal operation of the PoE system having multiple power source devices, it is necessary to provide a mechanism for rapid shutting off power supplied to a sufficient number of power consuming devices, when any power source device fails. This mechanism can prevent the system from total shutting down, due to failure of a small number of power source device. In the known arts, such as the aforementioned patents, a look-up-table, call a power supply to power consumption look-up-table, is provided, to define the corresponding relation of a plurality of power supply state combination to a plurality of power consumption control combination. For example, when all the power source devices are operating normally (power supply state: 1, 1, 1, 1), all port, such as 8 ports, are in the normal power consumption state (powered consumption state: 1, 1, 1, 1, 1, 1, 1, 1). However, when one power source shuts down, specific ports, such as ports with a lower priority value, needs to be shut off power supply, i.e., their corresponding port switches need to be turned OFF. The corresponding relation of the then power supply state combination and the power consumption control combination can thus be expressed as (1, 1, 1, 0/1, 1, 1, 1, 1, 1, 0). The remaining combinations of the look-up-table can be easily appreciated by any skilled person.

Among the above codes, the code indicating the ON/OFF state of the port switch, in correspondence with one power supply state combination, can be referred to as a power consuming control combination. When it is expressed by a signal or a control signal, it is a power consuming control signal.

This kind of the conventional power supply to power consumption look-up-table will not work, if a PoE system has a large number of power consuming devices. One of the reasons is, although the number of the digit of each combination code in the power supply to power consumption look-up-table is not limited, a lengthy signal would be necessary, when the length of the power consumption control code is lengthy, for example, with 64, 128, 256 or more digits. The lengthy signal would make the system footprint larger and structure complicated, and would offset all the advantages of using a look-up table. The use of a control device to control the power consumption of a greater number of power consuming devices is already an expected application. To design a useful control device for the power over Ethernet system having relatively large number of power source/consuming devices, this problem must be overcome.

Although it is not desirable to be bound by any theory, the inventors found that all PoE systems use a serial bus. When a control signal is quite lengthy (the number of digits of the signal is quite large), the serial bus becomes suitable for carrying the control signals. Using the existing serial bus to transmit switch control signals to the plurality of port switches can eliminate the need for a large number of wires. In addition, the power supply to power consumption look-up-table may be divided into a number of sub-tables and provided to the plurality of control circuits. Using a plurality of control circuit to provide the switch control signals, each control circuit would need to generate a control signal for a limited number of port switches, whereby the response time would be dramatically reduced, when the power supply device fails.

According to the embodiment of the present invention, the master controller 401 is not configured to generate power control signals, for directly providing to the individual port switches 311-31N. In the present invention, rather, the master controller 401 provides a second look-up-table memory 416, to store a second power supply to power consumption look-up-table, see FIG. 2. The second power supply to power consumption look-up-table defines a corresponding relation of a plurality of power supply state combination signals and a plurality of maximum power consumption values, indicating an upper limit of sum of power consumption allowable for all ports of the system, i.e., all ports in connection with the plurality of control circuits, under the corresponding power supply state combination. The master controller 401 provides the second power supply to power consumption look-up-table to each control circuit 421-42N, and the control circuit 421-42N store it in the first look-up-table memory 415, in the form of a full table or a sub-meter thereof, as the first power supply to power consumption look-up-table. When a power failure event occurs, the individual control circuits 421-42N determine the port switches that should be powered off according to the first power supply to power consumption look-up-table, and generate a power consumption control signal based on the judgment result and send it to each of the connected port switches 311-31N, 311'-31N', 311"-31N", . . . , 311'''-31N'''. In the preferred embodiment, the master controller 401 uses a serial signal bus 430 to transmit the second power supply to power consumption look-up-table, or a sub-table thereof, to the plurality of control circuits 421-42N. According to a preferred embodiment of the present invention, the serial signal bus 430 preferably uses the IIC (Inter-Integrated Circuit Protocol) communication protocol.

In implementation, in each control circuit 421-42N provided is a detection circuit 413 in connection with the input terminal 411, to inspect the power supply state of the plurality of power source devices 201-204 and to generate a power supply state combination signal as a result of the inspection. Each combination signal represents one combination of power supply state, as power good or failure. As a result, the inspection result of the detection circuit 413 represents a combination of power supply states of the power supply devices. The master controller 401 also provides a first look-up-table memory 415 for storing a first power supply to power consumption look-up-table, which indicates a corresponding relation of a plurality of power supply state combination signals and a plurality of maximum power consumption values, indicating an upper limit of sum of power consumption allowable for all ports 311-31N, 311'-31N', 311"-31N", . . . , 311'-31N''', in connection with the respective control circuit 421-42N, under the corresponding power supply state combination. The first power supply to power consumption look-up-table may be exactly the second power supply to power consumption look-up-table, or a sub-table thereof. The contents of the second power supply to power consumption look-up-table may be generated by the master controller 401 at the initial stage of the system, or set manually.

Figure 3:
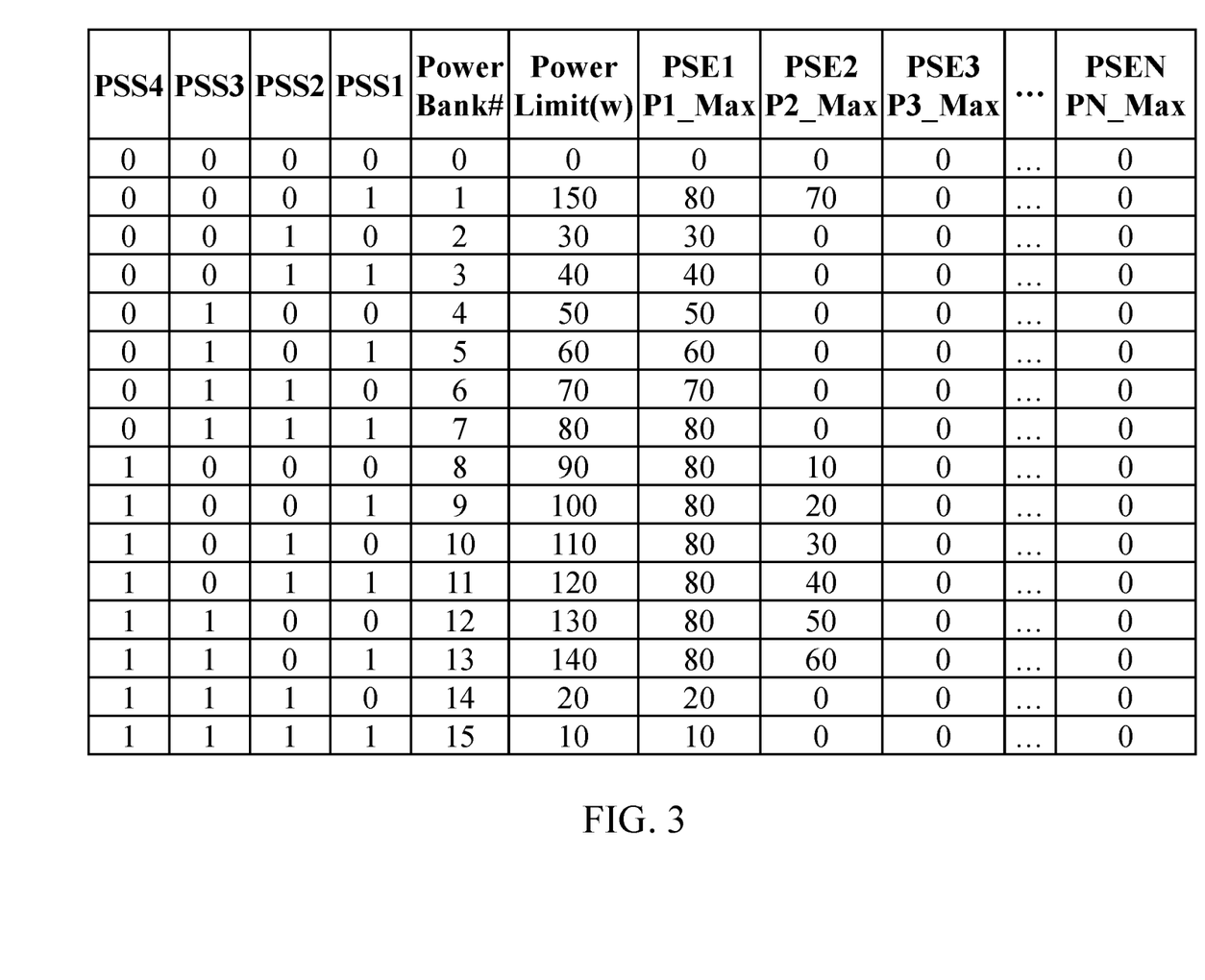
FIG. 3 is a diagram showing one example of the first power supply to power consumption look-up-table applicable in the invented control device for power over Ethernet system having multiple power source devices.

FIG. 3 is a diagram showing one example of the second power supply to power consumption look-up-table applicable in the invented control device for power over Ethernet system having multiple power source devices. As shown in the chart, values in the 4 rows from the left represent the power supply states of the power supply devices connected to the input terminal 411. The table shows that the input terminal 411 is connected to 4 power supply devices PSS4, PSS3, PSS2, and PSS1. Code 1 indicates the normal state (power good) of a power supply device; Code 0 indicates the power failure state of a power supply device. Each group (line) constitutes a power supply state combination. This table exhaustively lists all 16 possible power supply state combinations of 4 power supply devices. However, in application, the power supply to power consumption look-up-table does not necessarily list all possible combinations.

Moving forward to the right side, the field right after the power supply state combination is the power supply state combination code Power Bank #. This code is the result of converting the binary value of the power supply state combination values into its decimal value. In this embodiment the present invention tries to assigns a code to each power supply state combination in an intuitive way. Other methods that can assign codes for various combinations of power supply states can be applied to the present invention. Following the power supply state combination code is the total power supply value Power_Limit of the system. The unit of the value is not limited; it can be a current, a power or else. The value of this field is usually filled in manually. However, it may also be generated by the system, as a result of auto inspection. In the case of manual setting, the value is usually set according to management purposes, and does not necessarily represent the upper limit of the physical sum of power supply or power consumption of each group of communication ports.

The fields following the total power supply are the maximum power consumption values PSE1 P1_MAX to PSEN PN_MAX assigned to the port switch/communication port of/controlled by each control circuit for each of the power supply state combinations. The row number of this field is usually the same as the number of the ports switch, but may be different. The listed port switch codes relate to the port switches that are controlled by the power consumption state change operation of the present invention. Port switches not subject to the control need not be listed in the table. Further, code value 0 indicates the port needs to be shut off under the power supply state combination of the same line/column, whereby power supplied to this port must stop. All non-zero values in the field indicate that power supplied to these ports need not be shut off, while the specific non-zero values are actually for the manager's reference, because they mean nothing but "non-zero" to the system.

In addition to the power supply to power consumption look-up-table described above, other forms and/or contents of the power supply to power consumption look-up-table can also be applied to the present invention.

In a preferred embodiment of the present invention, the respective control circuits 421-42N may further comprise a first look-up-table memory 415, for storing the first power supply to power consumption look-up-table. In the preferred embodiments, the first power supply to power consumption look-up-table is a sub-table to the second power supply to power consumption look-up-table and defines the corresponding relation of a plurality of power supply state combination and a plurality of maximum power consumption value corresponding to the respective control circuits 421-42N. Taking the table of FIG. 3 as an example, in the first look-up-table memory 415 of the first control circuit 421, the first power supply to power consumption look-up-table includes the fields PSS4, PSS3, PSS2, PSS1 and PSE1 P1_MAX, only, while in the first look-up-table memory 415 of the second control circuit 422, the first power supply to power consumption look-up-table includes the fields PSS4, PSS3, PSS2, PSS1 and PSE2 P2_MAX, only, And so on.

In the preferred embodiment of the present invention, the master controller 401 may be configured to provide at the initial stage of the system, a sub-table of the second power supply to power consumption look-up-table pre-stored in the second look-up-table memory 415 to each of the plurality of control circuits 421-42N. The sub-table provided to a control circuit includes information relating to the respective control circuits, only. In practical applications, the master controller 401 can provide the second power supply to power consumption look-up-table to the plurality of control circuit 421-42N, whereby individual control circuits 421-42N then pick up the relative information from the second power supply to power consumption look-up-table and save it in the first look-up-table memory 415, as the first power supply to power consumption look-up-table.

Each control circuit 421-42N further provides a control signal generating circuit 414, which is connected to the detection circuit 413 and the first look-up-table memory 415. The control signal generating circuit 414 is configured to generate a power consumption control signal upon detection of a change in the power supply state combination by the detection circuit, and provide the power consumption control signal to the port switches 311-31N, 311'-31N', 311"-31N", ..., 311'''-31N''' in connection with the respective control circuit.

To achieve the above objective, the detection circuit 413 may be configured to generate a power supply state change signal when the received power supply state combination signal is different from the previous power supply state combination signal. After the control signal generating circuit 414 receives the power supply state change signal, a power consumption change control operation is activated, whereupon it generates a power consumption control signal based on the power supply state combination signal newly received by the detection circuit 413, and provide the power consumption control signal to the relative port switches 311-31N, 311'-31N', 311"-31N", ..., 311'''-31N'''.

In the preferred embodiment of the present invention, each of the control circuits 421-42N can be configured not to generate a power consumption state control signal, if a power supply state combination signal is the same as a previous one.

FIG. 2 shows N control circuits 421-42N are connected to the serial signal bus 430, and are connected communicatively to the master controller 401 by the serial signal bus 430. All or most of the control signals are transmitted via the serial signal bus 430. The control circuits 421-42N are respectively connected with the port switches 311-31N, 311'-31N', 311"-31N", ..., 311'''-31N''', to control the operation of the port switches 311-31N, 311'-31N', 311"-31N", ..., 311'''-31N'''. Each port switch 311-31N, 311'-31N', 311"-31N", ..., 311'''-31N''' controls the power consumption state of at least one communication port 301-30N (not shown in FIG. 2).

When a switch is ON, the corresponding port receives power from the PoE system; otherwise, when the switch is OFF, the corresponding port receives no electrical power. Each control circuit 421-42N uses the power consumption state control signal to control the above-mentioned operation of the corresponding port switch 311-31N, 311'-31N', 311"-31N", ..., 311'''-31N'''. Each of the communication ports 301-30N is connectable by a power consuming device (not shown).

In such embodiments, after the control signal generating circuit 414 of the plurality of control circuits 421-42N receives the power supply state combination code, it picks up a corresponding maximum power consumption value PSE1 P1_Max from the first power supply to power consumption look-up-table and activates the power consumption state change operation. It must be noted that the power supply state combination code itself is not only an activation signal, but also a signal representing the upper limit of the allowable power consumption value. This approach can save one step and achieve the purpose of immediate execution of the power consumption state change procedure. Approximately, the program can be advanced by 50 ms to 100 ms to avoid interruptions due to insertion of a power consuming device during this period.

Figure 4:
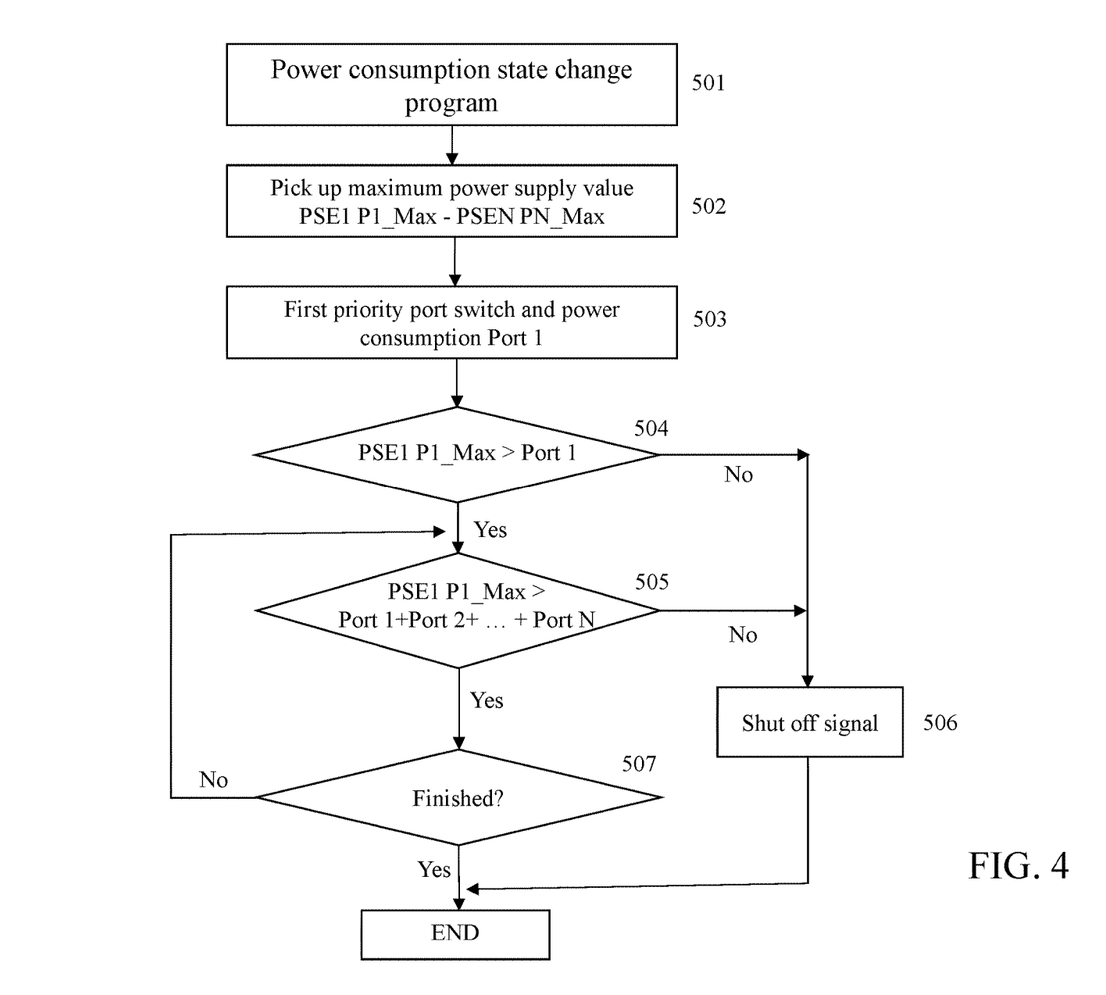
FIG. 4 shows a flowchart of a power consumption state change operation usable in the invented control device for power over Ethernet system having multiple power source devices.

According to the design of the present invention, in the invented control device for power over Ethernet system having multiple power source devices, the decision of which ports to shut off is executed by all the control circuit at a time. The operation time is thus shortened. FIG. 4 show a flowchart of a power consumption state change operation usable in the invented control device for power over Ethernet system having multiple power source devices. Hereinafter, an embodiment of the power consumption state change program will be described based on FIG. 4.

As shown in the figure, in step 501, the power consumption state change program is started by receiving the power supply state change signal, which relates to a power supply state combination signal newly received. In a preferred embodiment of the present invention, the power supply state change signal indicates the changed power supply state combination. For example, the power supply state change signal may be a code representing the power supply state combination, such as the number in the field "Power Bank #" in FIG. 3. In step 502 the control signal generating circuit 414 of the respective control circuits 421-42N picks up a maximum power consumption value PSE1 P1_Max-PSEN PN_MAX from the first power supply to power consumption look-up-table. For example, the first power supply to power consumption look-up-table of the control circuit 422 includes all the values in the fields "Power Bank #" and "PSE2 P2_Max" in FIG. 3. When the power supply state change signal indicates that the changed power supply state combination code is 9, the control signal generation circuit 414 picks up the corresponding maximum power consumption value 20. And so on. In step 503, the control signal generating circuit 414 identifies a port switch with the highest priority according to a priority table and obtains the power consumption value Port 1 of the port switch. In step 504, the control signal generating circuit 414 compares the maximum power consumption value PSE1 P1_Max with the power consumption value Port 1 of the first priority port switch. If PSE1 P1_Max>Port 1, it determines that Port 1 is continuously powered. Otherwise, it determines Port 1 shall be powered off, and in step 506 a power consumption control signal to shut off power to Port 1 and ports with lower priority is provided to the corresponding ports. When the determination in step 504 is YES, in step 505 the maximum power consumption value PSE1 P1_Max is compared with the sum of the power consumption value of the first priority port switch and the next priority port switch, Port 1+Port2. If PSE1 P1_Max>Port 1+Port 2, it is determined that Port 2 is continuously powered. Otherwise, it determines Port 2 to be powered off, and the step goes to 506, wherein a power consumption control signal to shut off power to Port 2 and ports with lower priority is provided to the corresponding ports. If the determination in step 505 is YES, it determines in step 407 whether the power consumption values of all the port switches have been calculated. If NO, the step returns to 505, to compares the maximum power consumption value PSE1 P1_Max the sum of the first and a predetermined orders of priorities port switch, Port 1+Port 2+ . . . +Port N. If the determination in step 507 is YES, the power consumption state change program ends.

In the foregoing embodiment, if any port switch is determined to be powered off, the control circuit 421-42N determines that port switch and the port switch with a lower priority should be powered off. It is however possible to consider the power consumption and the priority of each port switch at the same time. That is, after determining that a specific port switch should be powered off, continue to determine whether the sum of the power consumption of all the port switches with the higher priority and the port switch of the next priority exceeds the power supply upper limit. If not, it is determined that the port switching with the next priority does not need to power off. For example, in the foregoing step 505 the control circuit determines Port 2 shall be powered off. Following this, the control circuit may continue to determine if the following is true: PSE1 P1_Max>Port 1+Port 2+Port 4? Although this approach helps to keep as many ports uninterrupted as possible, the disadvantage is that it consumes a long time.

In the power consumption state change program of the present invention, if each control circuit is in control of 8 port switches, each port switch needs 50 μs to complete the power consumption state change program, therefore each control circuit needs at most 400 μs (50 μs×8 ports) to complete the emergency shut off operation. In a system with a plurality of power supply devices, 400 μs would be the longest time needed.

Figure 6:
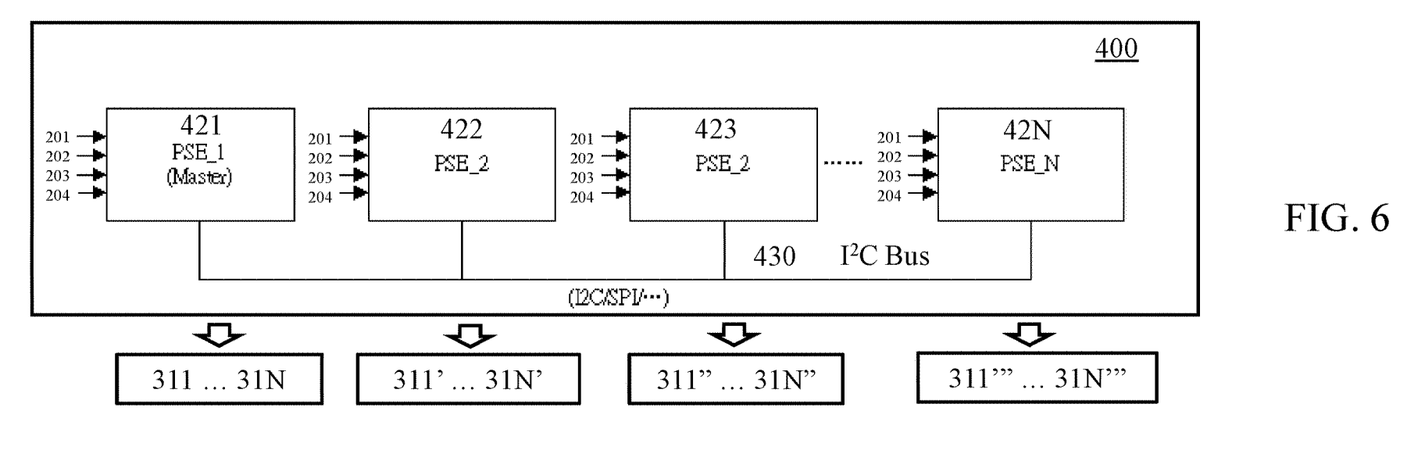
FIG. 6 shows a schematic structural diagram of another embodiment of the invented control device for power over Ethernet system having multiple power source devices.

FIG. 6 shows a schematic structural diagram of a second embodiment of the invented control device for power over Ethernet system having multiple power source devices. The architecture shown in FIG. 6 is basically the same as that in FIG. 2, except that in FIG. 6 there is not an independent master controller 401. One of the control circuits 421-42N, for example, the control circuit 421, functions as the master controller, and stores the second power supply to power consumption look-up-table in the first look-up-table memory 415. The (master) control circuit 421 is further configured to: in the initial stage of the system, provide the second power supply to power consumption look-up-table stored in the first look-up-table memory, or a sub-table of the second power supply to power consumption look-up-table, to the remaining plurality of control circuit 422-42N, as the first power supply to power consumption look-up-table of the remaining control circuits 422-42N. In such embodiments, the second power supply to power consumption look-up-table or its sub-table is provided via the signal bus 430. If the table received by the remaining control circuits is a full table of the second power supply to power consumption look-up-table, necessary contents in the table may be picked up to form the first power supply to power consumption look-up-table.

What is claimed is:

1. A control device for a power over Ethernet system having a plurality of power source devices, comprising:
    a plurality of control circuits, each connected to a plurality of power supply devices and a plurality of port switches, each port switch controlling a power consumption state of at least one port for connection by a power consuming device;
    wherein each control circuit comprises:
    an input terminal for connecting a plurality of power source devices;
    a detection circuit connected to the input terminal for receiving a power supply state combination signal representing a combination of power supply state of the plural power source devices;
    a first look-up-table memory to store a first power supply to power consumption look-up-table defining a corresponding relation of a plurality of power supply state combination and a plurality of maximum power consumption values; and
    a control signal generating circuit connected to the detection circuit and the first look-up-table memory and configured to: upon receipt of a power supply state change signal from the detection circuit, generate a power consumption control signal corresponding to the received power supply state combination signal and a corresponding maximum power consumption value in the first power supply to power consumption look-up-table and provide the power consumption control signal to the plurality of port switches for turning ON or OFF the port switches;
    wherein the detection circuit is configured to: upon detection of a received power supply state combination signal different from a previously received power supply state combination signal, generate a power supply state change signal; and
    a signal bus connecting the plurality of control circuits;
    the control device further comprising a master controller, wherein the master controller is equipped with a second look-up-table memory for storing a second power supply to power consumption look-up-table; wherein the second power supply to power consumption look-up-table defines a corresponding relation of a plurality of power supply state combination signals and a plurality of maximum power consumption values, indicating an upper limit of sum of power consumption allowable for all ports in connection with the plurality of control circuits, corresponding to each power supply state combination signal.

2. A control device for a power over Ethernet system having a plurality of power source devices according to claim 1, wherein each control circuit determines a port switch to turn OFF in each case of the plurality of maximum power consumption values according to a predetermined priority order.

3. A control device for a power over Ethernet system having a plurality of power source devices according to claim 1, wherein the signal bus is a serial bus.

4. A control device for a power over Ethernet system having a plurality of power source devices according to claim 1, wherein the signal bus uses the IIC (Inter-Integrated Circuit Protocol) communication protocol.

5. A control device for a power over Ethernet system having a plurality of power source devices according to claim 1, wherein the maximum power consumption values indicate an upper limit of total power consumption of all ports in connection with a control circuit in correspondence with a power supply state combination signal.

6. A control device for a power over Ethernet system having a plurality of power source devices according to claim 1, wherein the first power supply to power consumption look-up-table defines a corresponding relation of a plurality of power supply state combination signals and a plurality of maximum power consumption values.

7. A control device for a power over Ethernet system having a plurality of power source devices according to claim 1, wherein the master controller is further configured to: in the initial stage of the system, provide a sub-table of the second power supply to power consumption look-up-table to each corresponding one of the plurality of control circuit; and wherein the plurality of control circuits is further configured to: after receiving the power supply to power consumption look-up-sub-table provided by the master controller, store the power supply to power consumption look-up-sub-table in the first look-up-table memory.

8. A control device for a power over Ethernet system having a plurality of power source devices according to claim 1. wherein the master controller is further configured to: in the initial stage of the system, provide the second power supply to power consumption look-up-table to the plurality of control circuits; and wherein the plurality of control circuits is further configured to: after receiving the second power supply to power consumption look-up-table provided by the master controller, store the second power supply to power consumption look-up-table in the first look-up-table memory as the first power supply to power consumption look-up-table.

9. A control device for a power over Ethernet system having a plurality of power source devices according to claim 8, wherein the plurality of control circuits is further configured to: after receiving the second power supply to power consumption look-up-table provided by the master controller, pick up relative maximum power consumption values from the second power supply to form the first power supply to power consumption look-up-table.

10. A control device for a power over Ethernet system having a plurality of power source devices according to claim 1, wherein the master controller is one of the plurality of control circuits, and is configured to store the second power supply to power consumption look-up-table in the first look-up-table memory and to: at the initial stage of the system provide the second power supply to power consumption look-up-table to all other control circuits via the signal bus, and the other control circuits are respectively configured to: after receiving the second power supply to power consumption look-up-table, pick up related maximum power consumption values to form the first power supply to power consumption look-up-table, and store the look-up-table so formed in the first look-up-table memory.

11. A control device for a power over Ethernet system multiple a plurality of power source devices according to claim 1, wherein the master controller is one of the plurality of control circuits, and is configured to store the second power supply to power consumption look-up-table in the first look-up-table memory and to: at the initial stage of the system provide a sub-table of the second power supply to power consumption look-up-table to the respective other control circuits via the signal bus, and the other control circuits are respectively configured to: after receiving the sub-table of the second power supply to power consumption look-up-table, store the sub-table as the first power supply to power consumption look-up-table in the first look-up-table memory, wherein the sub-table comprises maximum power consumption values corresponding to each of the other control circuits.

12. A control device for a power over Ethernet system having a plurality of power source devices according to claim 6, wherein the second power supply to power consumption look-up-table defines a corresponding relation of a plurality of power supply state combination signals and a plurality of maximum power consumption values.

13. A control device for a power over Ethernet system having a plurality of power source devices according to claim 1, wherein the power supply state combination signal comprises a code with the same number of digits as the number of the plurality of power source devices.

14. A control device for a power over Ethernet system having a plurality of power source devices according to claim 1, wherein the power supply state combination signal comprises a code with the same number of digits as the number of the plurality of power source devices.

15. A power over Ethernet system having a plurality of power source devices, comprising:
a plurality of power source devices;
a plurality of communication ports, each communication port to be connected by a power consuming device, to establish a signal and power connection with the power consuming device; each communication port having a port switch to control power supplied to the port; and
a control device in connection with the plurality of power source devices and the plurality of communication ports via a network cable, to convert power supplied by the power source devices into electrical power for use by a power consuming device connected to a communication port, and to generate power consumption control signals for control of power supplied to respective communication ports from the plurality of power source devices;
wherein the control device is one control device for power over Ethernet system having multiple power source devices according to any one of claims 1-6 and 7-14.

* * * * *